(12) United States Patent
Iacovoni et al.

(10) Patent No.: US 7,748,166 B2
(45) Date of Patent: Jul. 6, 2010

(54) VEHICLE DOOR GLASS BLOCKER AND BREAKER

(75) Inventors: Donald P. Iacovoni, Plymouth, MI (US); Paul L. Heirtzler, Northville, MI (US); Jason D. Scott, Farmington Hills, MI (US); Martin A. Trenkle, Dearborn, MI (US); Thiag Subbian, Framington Hills, MI (US); Echung Su, Rochester Hills, MI (US); Don K. Wallace, Riverview, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/047,386

(22) Filed: Mar. 13, 2008

(65) Prior Publication Data

US 2008/0258505 A1   Oct. 23, 2008

Related U.S. Application Data

(60) Provisional application No. 60/925,588, filed on Apr. 20, 2007.

(51) Int. Cl.
*E05B 65/10* (2006.01)

(52) U.S. Cl. .................. 49/141; 296/187.09; 296/187.1; 296/146.2

(58) Field of Classification Search .............. 49/502, 49/141, 348, 349; 296/187.03, 187.09, 187.1, 296/187.11, 187.12, 146.2
See application file for complete search history.

(56) References Cited

U.S. PATENT DOCUMENTS

| 3,273,286 | A | * | 9/1966 | Brissette et al. ............... 49/227 |
| 5,318,145 | A | * | 6/1994 | Vollmer ...................... 180/274 |
| 5,548,929 | A | * | 8/1996 | Larsen et al. .................. 49/441 |
| 5,752,346 | A | * | 5/1998 | Kritzler et al. ................. 49/503 |
| 6,205,714 | B1 | * | 3/2001 | Staser et al. .................. 49/502 |

FOREIGN PATENT DOCUMENTS

| DE | 4016612 | 11/1991 |
| DE | 102006028484 | 12/2007 |
| FR | 2096188 | 2/1972 |
| FR | 2874559 | 3/2006 |

* cited by examiner

*Primary Examiner*—Katherine W Mitchell
*Assistant Examiner*—Catherine A Kelly
(74) *Attorney, Agent, or Firm*—Gregory Brown; Price, Heneveld, Cooper, DeWitt & Litton, LLP

(57) ABSTRACT

A vehicle door glass blocker assembly including a blocking bracket securable to a vehicle door frame panel, and a blocking edge integrally formed with the blocking bracket, being substantially normal to a vertical edge of a vehicle window, and being capable of at least partially shattering the vehicle window when the window impacts the blocking edge during a vehicle crash event. A blocking protrusion may be coupled to the blocking bracket, be longitudinally disposable between the vehicle window and a vehicle door latch mechanism, and be capable of at least partially preventing transverse displacement of the vehicle window. A support bracket may be secured to the blocking bracket, and a glass run extrusion may be secured to the support bracket, be adapted to accept a vertical edge of the vehicle window, and be capable of reducing vibrations in the vehicle window.

11 Claims, 8 Drawing Sheets

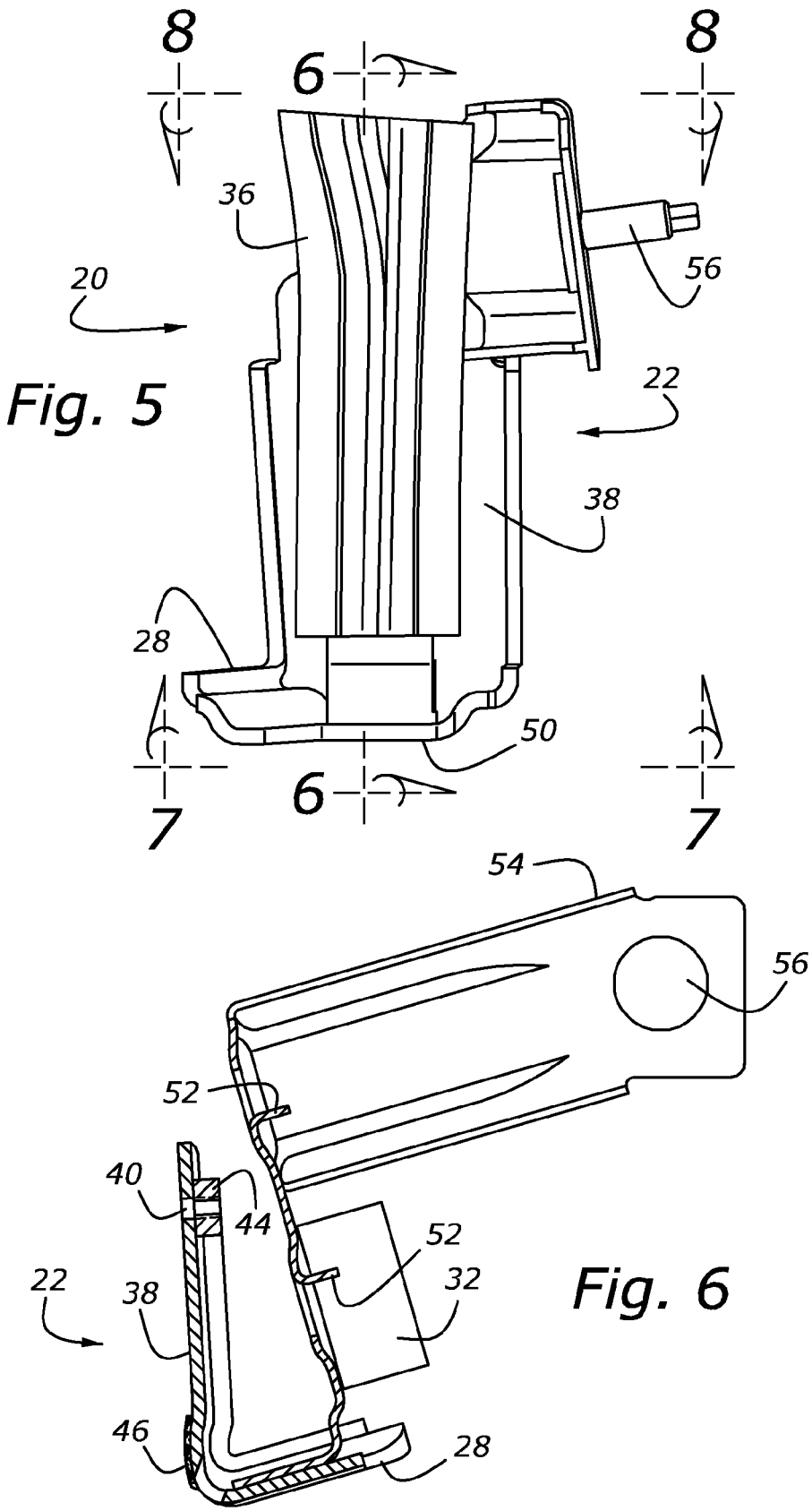

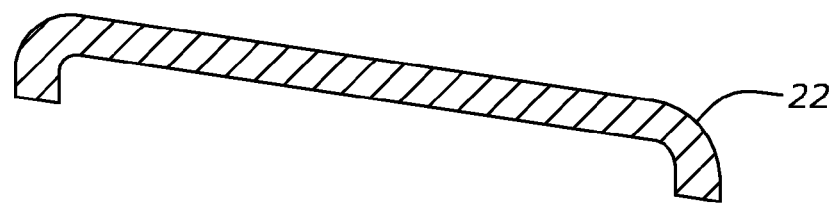
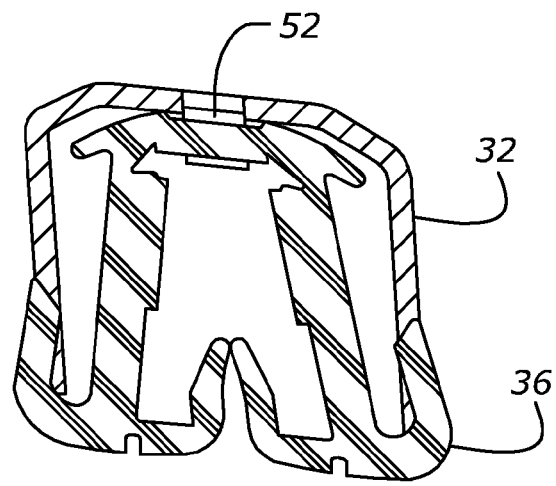
Fig. 11
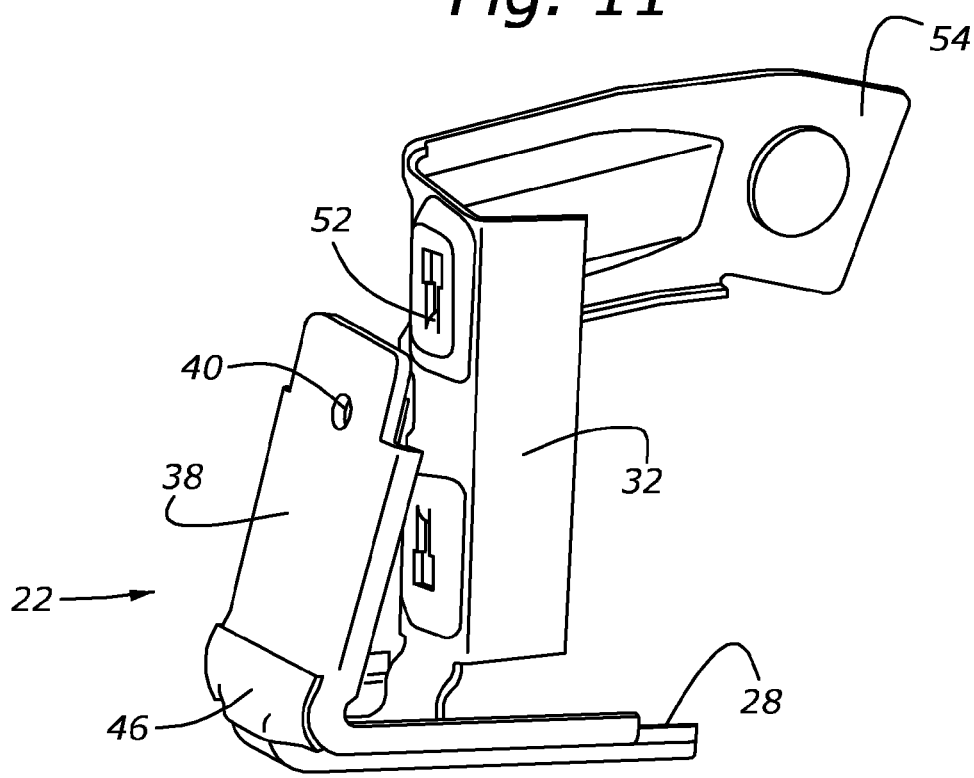
Fig. 12

VEHICLE DOOR GLASS BLOCKER AND BREAKER

RELATED APPLICATIONS

This application claims benefit of priority of Provisional Application Ser. No. 60/925,588 filed Apr. 20, 2007, hereby incorporated by reference in its entirety.

BACKGROUND OF INVENTION a. Field of Invention

The invention relates generally to vehicle safety devices, and more particularly to a bracket assembly mounted to the interior of a vehicle door frame adapted to protect the vehicle door latch from contact with the vehicle window in the event of a frontal crash.

b. Description of Related Art

Passenger safety is of importance to today's car manufacturers. With the development of crumple zones, laminated safety glass, and air bags, manufacturers have provided a relatively secure environment to passengers seated inside the vehicle's cabin. However, certain crash events present risks that could compromise the interior safety features of a vehicle. Specifically, in the event of a frontal crash or offset frontal crash, deformation of the vehicle structure could rearwardly displace an unbroken side door window housed inside the car door cavity. The unbroken window, as it is displaced, can impact the door latch actuator mechanism, triggering the latch and thrusting the car door open.

While various mechanisms have been developed to shatter the glass of a vehicle's side window in the event of a collision, such mechanisms do not provide protection against the possible triggering of the door latch actuator mechanism during a frontal impact collision. For example, U.S. Pat. No. 5,318,145 to Vollmer discloses a striker device (5) that is actuated by a sensor to impact and thereby shatter the side window in the event of a crash. The device of Vollmer, however, relies on a complex sensor system to detect an impact and an equally elaborate pyrotechnic triggering device to activate the breaker. Such a complicated system is expensive, difficult to install, and prone to failure. Most importantly, the device of Vollmer is only triggered from a side impact collision and therefore, in the event of a frontal impact, the unbroken side window can still trigger the door latch actuator mechanism and thus thrust the vehicle's door open.

Similarly, French Patent No. FR 2,874,559 to Olivier provides a mechanism to shatter a side window in the event of a crash. Olivier discloses a striker (30) and window glass, both mounted inside a vehicle door frame (10). The striker (30) is cylindrical in shape with a pointed end, and the pointed end is fixed in a position near the vehicle's window glass. If a force is applied to the vehicle door in a direction normal to the surface of the vehicle window, as occurs during a side impact crash, the vehicle window will be displaced in the direction of striker (30). If the force is relatively large, the vehicle window will impact the pointed end of striker (30) and striker (30) will break the glass of the vehicle window before the vehicle window impacts door lock (14), thus protecting door lock (14) from damage.

While the device of Olivier overcomes several of the drawbacks of the device of Vollmer, particularly those associated with high cost and complex activation, the device of Olivier still suffers from several significant shortcomings. Specifically, striker (30) only impacts and breaks the vehicle window glass when the collision force is directed normal to the vehicle window, such as during a side impact crash event. In the case of a frontal or offset frontal crash event, when the displacement of the vehicle's side door window is in a direction substantially parallel to the plane of the window, striker (30) does not contact the door glass, and is therefore unable to break the glass of the vehicle window. Therefore, the vehicle window can still impact the door latch actuator mechanism and open the vehicle's door.

It is therefore desirable to provide an inexpensive and simple to install vehicle window blocker and breaker that can shatter the glass of a vehicle window following a frontal crash event and prevent the vehicle window from impacting and triggering the vehicle's door latch actuator mechanism.

SUMMARY OF THE INVENTION

The invention overcomes the drawbacks and deficiencies of prior art vehicle glass safety devices by providing a vehicle door glass blocker assembly including a blocking bracket securable to a vehicle door frame panel, and a blocking edge integrally formed with the blocking bracket, being substantially normal to a vertical edge of a vehicle window when secured to the vehicle door frame panel, and being capable of at least partially shattering the vehicle window when the vehicle window impacts the blocking edge during a vehicle crash event. A blocking protrusion may be coupled to the blocking bracket, be longitudinally disposable between the vehicle window and a vehicle door latch mechanism, and be capable of at least partially preventing transverse displacement of the vehicle window. A support bracket may be secured to the blocking bracket, and a glass run extrusion may be secured to the support bracket, be adapted to accept a vertical edge of the vehicle window, and be capable of reducing vibrations in the vehicle window.

The invention also provides a vehicle door glass blocker assembly including a blocking bracket securable to a vehicle door frame panel, and a blocking edge integrally formed with the blocking bracket, be substantially normal or transverse to an edge of a vehicle window when secured to the vehicle door frame panel, and be capable of at least partially shattering the vehicle window when the vehicle window impacts the blocking edge during a vehicle crash event.

For the assembly described above, the assembly may further include a blocking protrusion coupled to the blocking bracket, be generally longitudinally disposable between the vehicle window and a vehicle door latch mechanism, and be capable of at least partially preventing transverse displacement of the vehicle window. A support bracket may be secured to the blocking bracket. A glass run extrusion may be secured to the support bracket, be adapted to accept an edge of the vehicle window, and be capable of reducing vibrations in the vehicle window. One or more channel tabs may be integrally formed with a channel portion of the support bracket, the channel tab being adapted to secure the glass run extrusion to the channel portion of the support bracket.

The invention yet further provides a vehicle including a vehicle door glass blocker assembly having a blocking bracket secured to a vehicle door frame panel, and a blocking edge integrally formed with the blocking bracket, being substantially normal or transverse to an edge of a vehicle window, and being capable of at least partially shattering the vehicle window when the vehicle window impacts the blocking edge during a vehicle crash event.

For the vehicle described above, the assembly may further include a blocking protrusion coupled to the blocking bracket, being generally longitudinally disposed between the vehicle window and a vehicle door latch mechanism, and being capable of at least partially preventing transverse displacement of the vehicle window. A support bracket may be secured to the blocking bracket. A glass run extrusion may be secured to the support bracket, be adapted to accept an edge of the vehicle window, and be capable of reducing vibrations in the vehicle window. One or more channel tabs may be integrally formed with a channel portion of the support bracket, the channel tab being adapted to secure the glass run extrusion to the channel portion of the support bracket.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings:

FIG. 5 is a back view of the vehicle door glass blocker assembly of FIG. 3, taken generally in the direction of arrows 5-5 in FIG. 3;

FIG. 6 is a cross-sectional view of the vehicle door glass blocker assembly of FIG. 3, taken generally along line 6-6 in FIG. 5, with certain components omitted for clarity;

FIG. 11 is a cross-sectional view of the vehicle door glass blocker assembly of FIG. 3, taken generally along line 11-11 in FIG. 9; and FIG. 12 is another isometric view of the vehicle door glass blocker assembly of FIG. 3.

DETAILED DESCRIPTION OF THE PREFERRED EMBODIMENTS

Figure 1A:
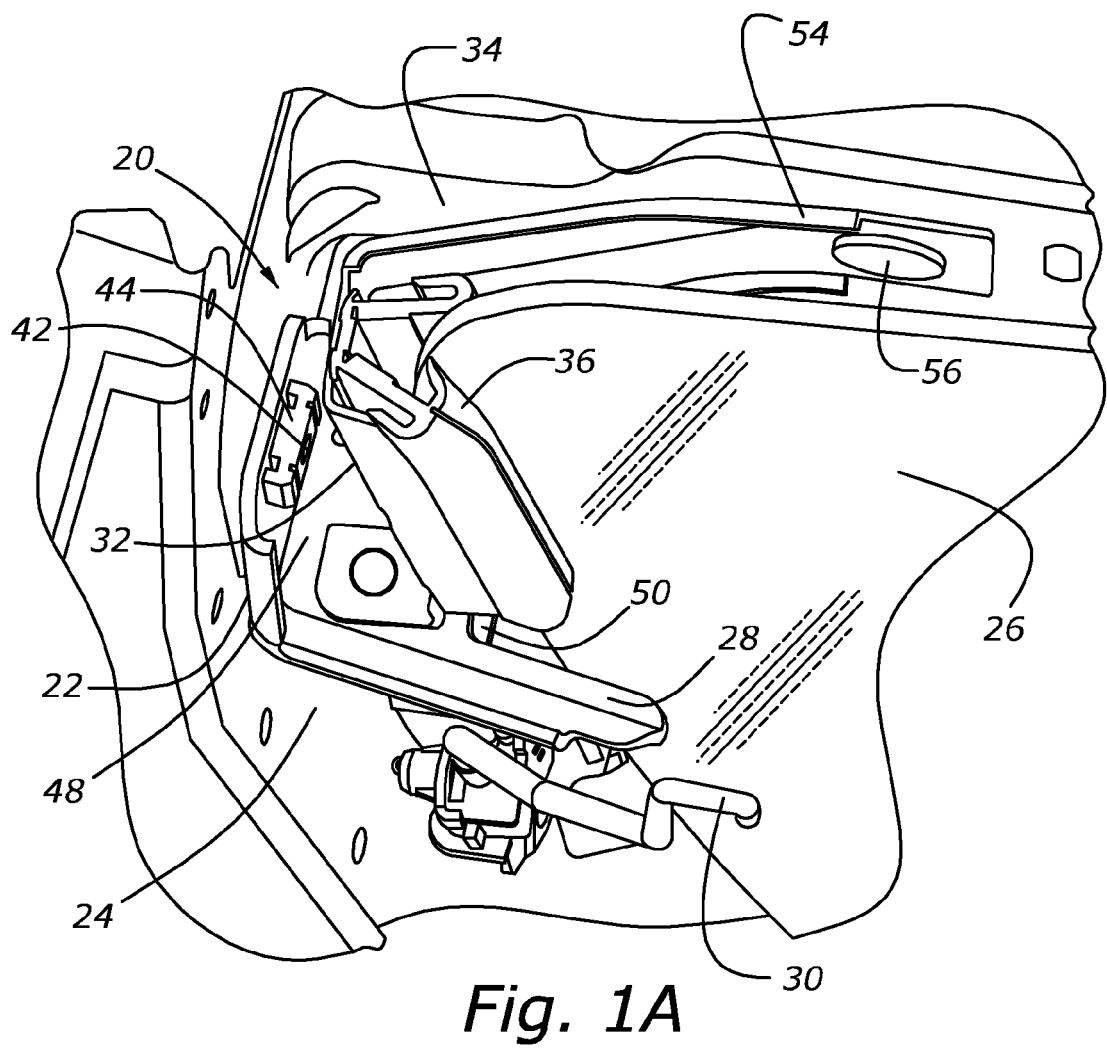
FIG. 1A is an isometric view of an embodiment of a vehicle door glass blocker assembly according to the present invention, secured to a vehicle's door frame panels.
Figure 1B:
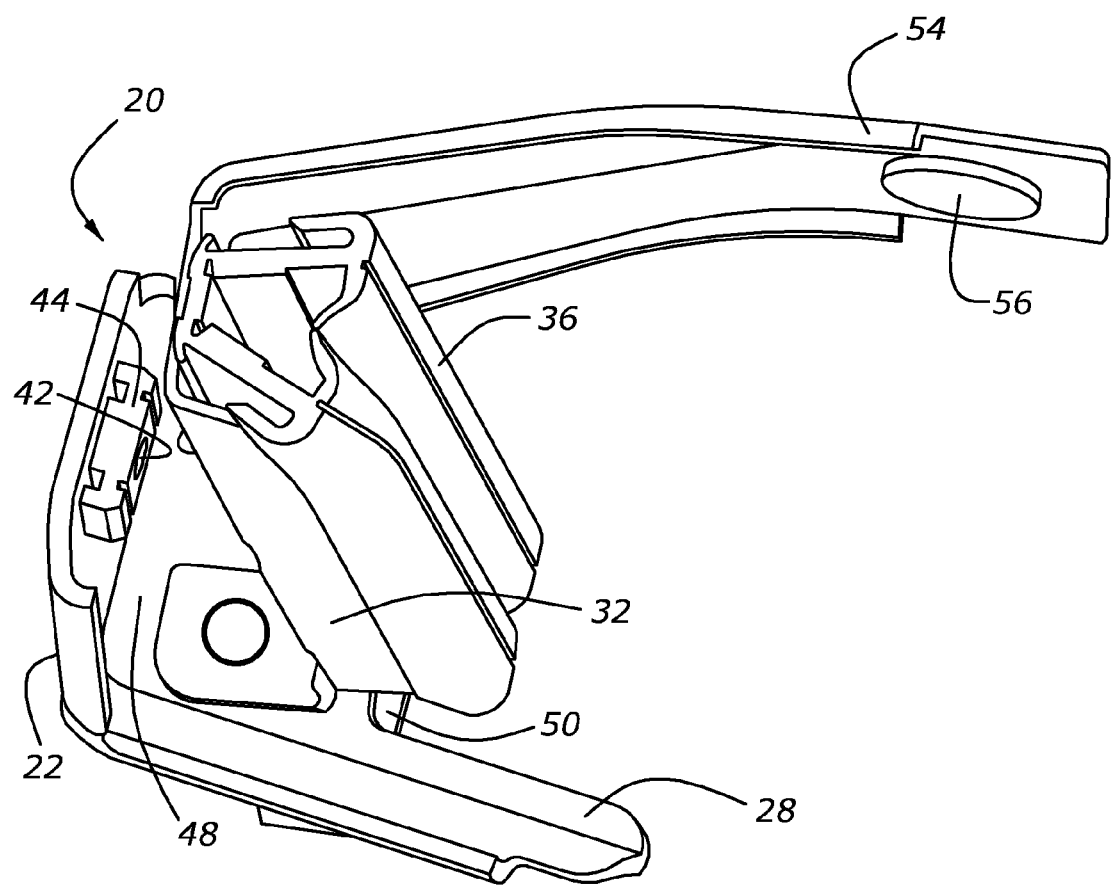
FIG. 1B is an isometric view of the vehicle door glass blocker assembly of FIG. 1A, without the associated vehicle structure.

Referring now to the drawings wherein like reference numerals designate corresponding parts throughout the several views, FIGS. 1A-12 illustrate various views of a vehicle door glass blocker and breaker assembly according to the present invention, the assembly being hereinafter generally designated "vehicle door glass blocker assembly 20."

Referring to FIGS. 1A-12, vehicle door glass blocker assembly 20 may generally include a blocking bracket 22 secured to vehicle door frame rear panel 24, with panel 24 being one of a plurality of vehicle door frame panels that define the vehicle door frame interior. Blocking bracket 22 may be adapted to block or shatter vehicle window 26 if window 26 is displaced towards blocking bracket 22 in a longitudinal direction, herein defined to be a direction that is generally parallel to a horizontal axis passing through the length of vehicle window 26. Blocking bracket 22 may also include an elongated blocking protrusion 28 oriented in the longitudinal direction and disposed between vehicle window 26 and door latch actuator rod 30. Blocking protrusion 28 may be adapted to prevent the intact or partially shattered vehicle window 26 from contacting door latch actuator rod 30 (or any other component of the latch mechanism that may deploy the latch) if window 26 is displaced in a transverse direction, herein defined to be a direction that is generally horizontal and normal to a horizontal axis passing through the length of vehicle window 26. Vehicle door glass blocker assembly 20 may also include a support bracket 32 coupled to blocking bracket 22 and vehicle door frame side panel 34, with panel 34 being one of a plurality of vehicle door frame panels that define the vehicle door frame interior. Support bracket 32 may include a vertically disposed channel portion that is adapted to secure a glass run extrusion 36 capable of receiving an edge of vehicle window 26, thereby preventing or reducing vibration of vehicle window 26.

As illustrated in FIGS. 1A-12, in an exemplary embodiment, blocking bracket 22 may include a substantially planar door frame mounting surface 38 adapted to mate with a corresponding surface on vehicle door frame rear panel 24 (see especially FIG. 6). Door frame mounting surface 38 may also include a door frame mounting aperture 40 that is centrally disposed near the top edge of surface 38 (see especially FIG. 8). The door frame mounting aperture 40 may be dimensioned to receive a frame mounting screw 42 which is adapted to secure blocking bracket 22 to vehicle door frame rear panel 24.

In order to secure blocking bracket 22 to vehicle door frame rear panel 24, frame mounting screw 42 may be first inserted into a retainer 44. Retainer 44 may be an injection molded plastic part having a generally rectangular cross-sectional shape with an aperture dimensioned to receive frame mounting screw 42. Retainer 44 may be adapted to distribute pressure exerted by frame mounting screw 42 over a relatively wide area on door frame mounting surface 38, thus preventing damage to the area surrounding door frame mounting aperture 40 of blocking bracket 22. Frame mounting screw 42, with retainer 44 coupled thereto, may then be inserted into door frame mounting aperture 40 of blocking bracket 22. Frame mounting screw 42 may next be received into an aperture (not shown) on vehicle door frame rear panel 24, and then tightened to a specified torque, thus securing blocking bracket 22 to vehicle door frame rear panel 24.

Figure 2:
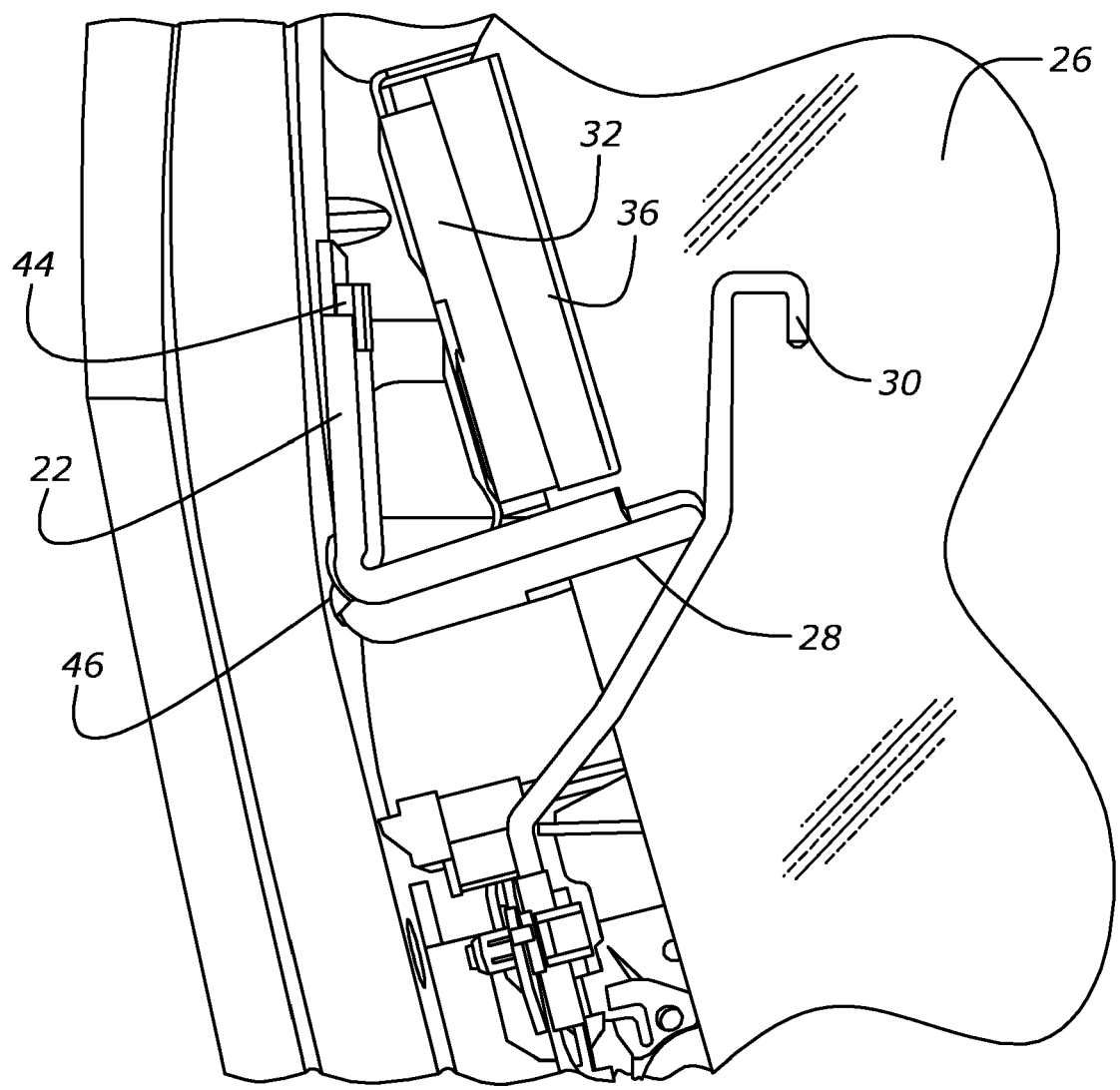
FIG. 2 is a left side view of the vehicle door glass blocker assembly of FIG. 1A, secured to a vehicle's door frame panels.
Figure 3:
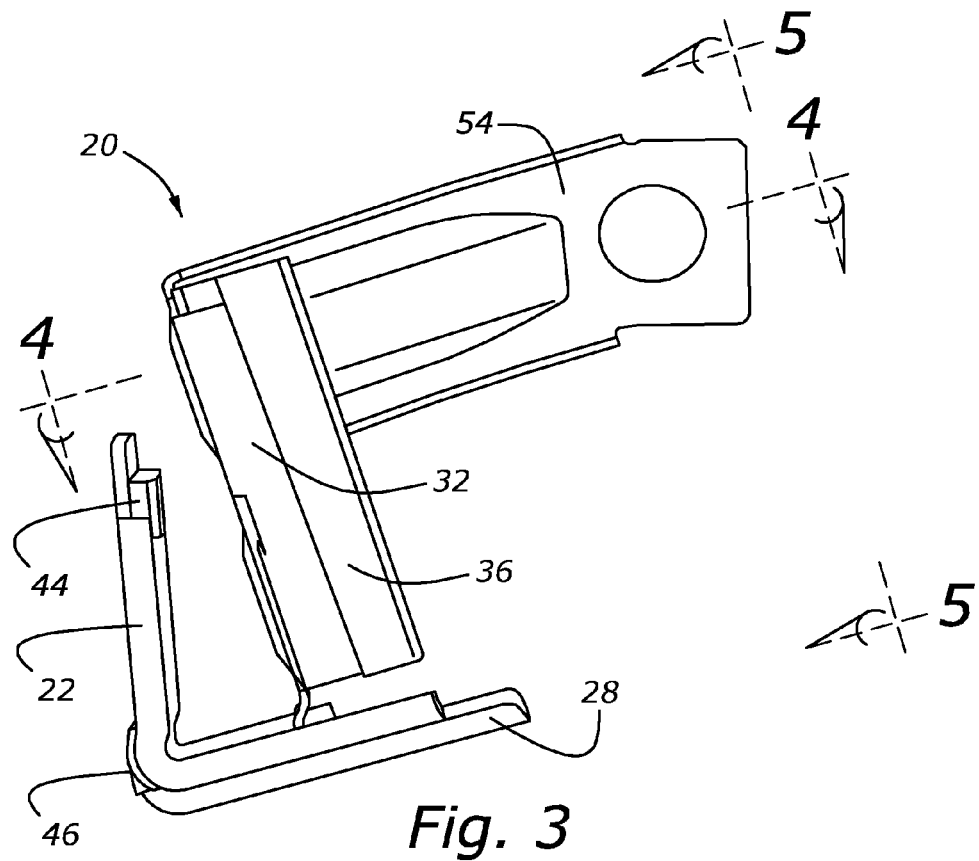
FIG. 3 is another side view of the vehicle door glass blocker assembly of FIG. 1A, with certain features omitted for clarity.
Figure 4:
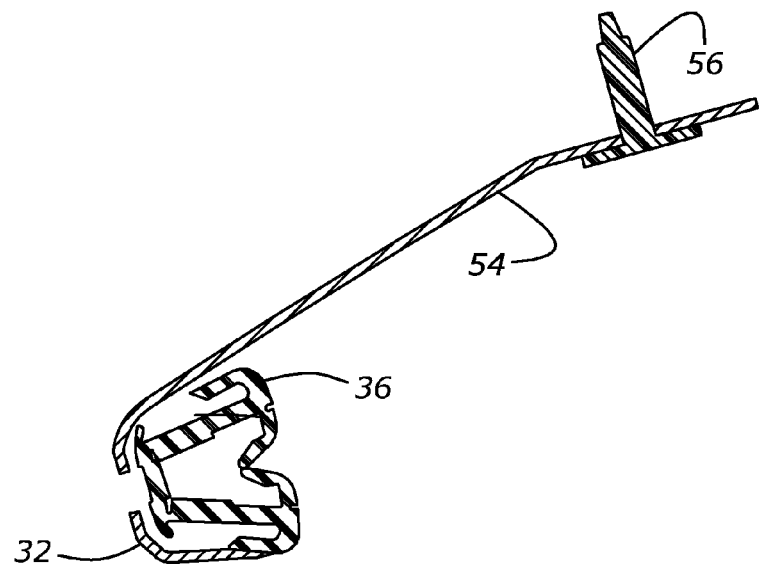
FIG. 4 is a cross-sectional view of the vehicle door glass blocker assembly of FIG. 3, taken generally along line 4-4 in FIG. 3.

In order to protect the surface of the vehicle door frame rear panel 24 from abrasion damage caused by contact with blocking bracket 22, blocking bracket 22 may also include a corner protector 46 (see FIG. 2). Corner protector 46 may be a generally rectangular pad having a surface comprised of foam, felt, or any other suitable material, and having an adhesive backing allowing corner protector 46 to be secured to a surface on blocking bracket 22. Corner protector 46 may be adapted to be secured to any portion of blocking bracket 22 that can come in contact with any portion of the vehicle door frame. In an exemplary embodiment, corner protector 46 may be secured to the lower rear surface of door frame mounting surface 38 in a position that will prevent direct contact between blocking bracket 22 and vehicle door frame rear panel 24.

As shown in FIG. 1A, blocking bracket 22 may also include a substantially planar support bracket mounting surface 48 that is generally oriented perpendicular to the rearmost edge of vehicle window 26. Support bracket mounting surface 48 may include a blocking edge 50 which is disposed along the transverse edge of support bracket mounting surface 48 and is perpendicularly oriented proximate to the rearmost vertical edge of vehicle window 26. When, following a frontal crash event, vehicle window 26 is displaced in a direction towards vehicle door frame rear panel 24, blocking edge 50 is adapted to impact the rearmost vertical edge of vehicle window 26 and prevent further rearward displacement. If vehicle window 26 impacts blocking edge 50 with a sufficient amount of force, the impact of vehicle window 26 against the rigid blocking edge 50 will shatter vehicle window 26.

As briefly discussed above, blocking protrusion 28 may be adapted to prevent significant transverse displacement of vehicle window 26 in the direction of door latch actuator rod 30 following contact with blocking edge 50 or the shattering of vehicle window 26 by blocking edge 50. Since blocking protrusion 28 prevents vehicle window 26 from contacting door latch actuator rod 30, door latch actuator rod 30 will not be inadvertently triggered during a frontal collision event and the vehicle door will remain closed. In an exemplary embodiment, blocking protrusion 28 may be integrally formed with blocking bracket 22 and, more specifically, integrally formed with support bracket mounting surface 48.

Figure 7:
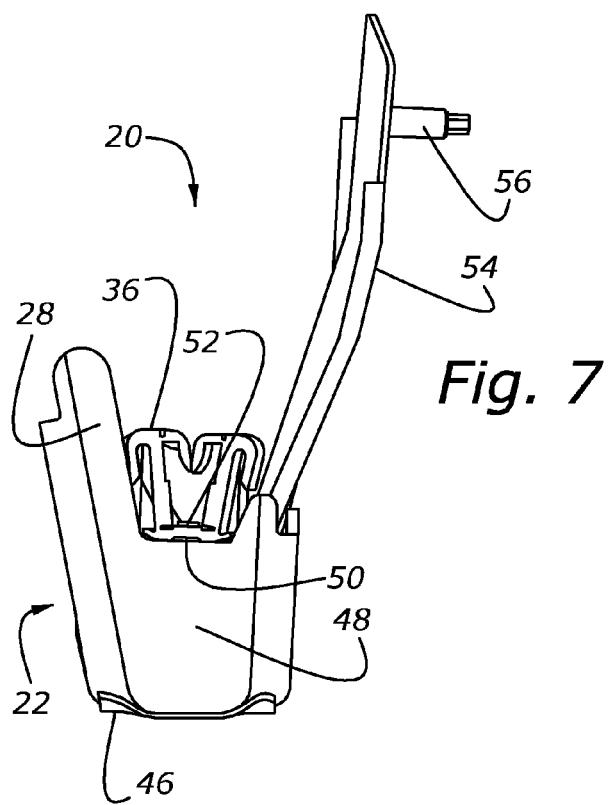
FIG. 7 is a bottom view of the vehicle door glass blocker assembly of FIG. 3, taken generally in the direction of arrows 7-7 in FIG. 5.
Figure 8:
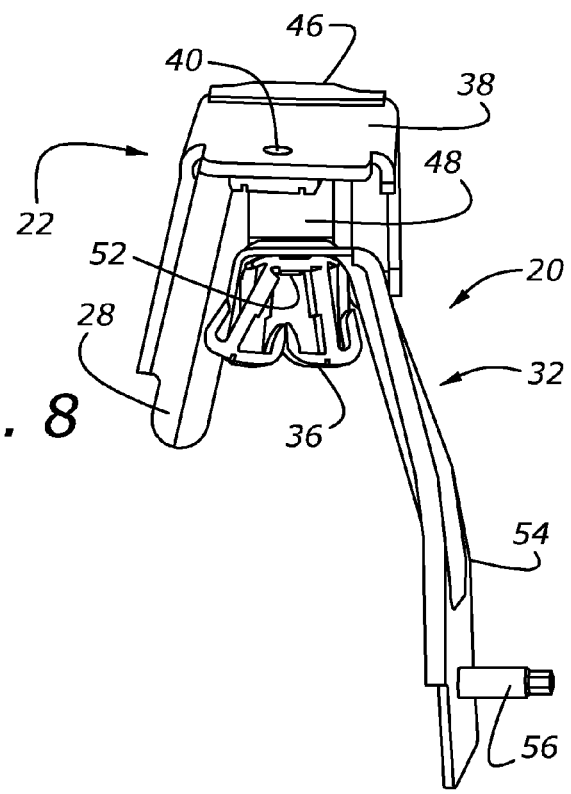
FIG. 8 is a top view of the vehicle door glass blocker assembly of FIG. 3, taken generally in the direction of arrows 8-8 in FIG. 5.
Figure 9:
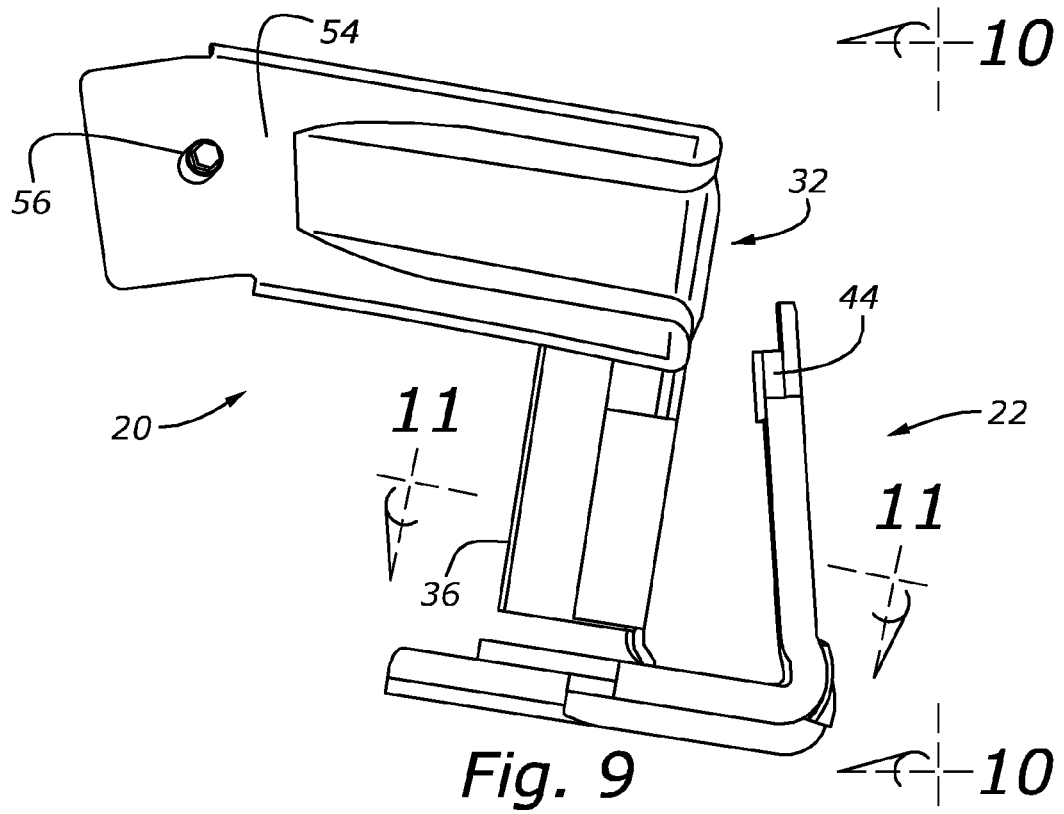
FIG. 9 is a right side view of the vehicle door glass blocker assembly of FIG. 3.
Figure 10:
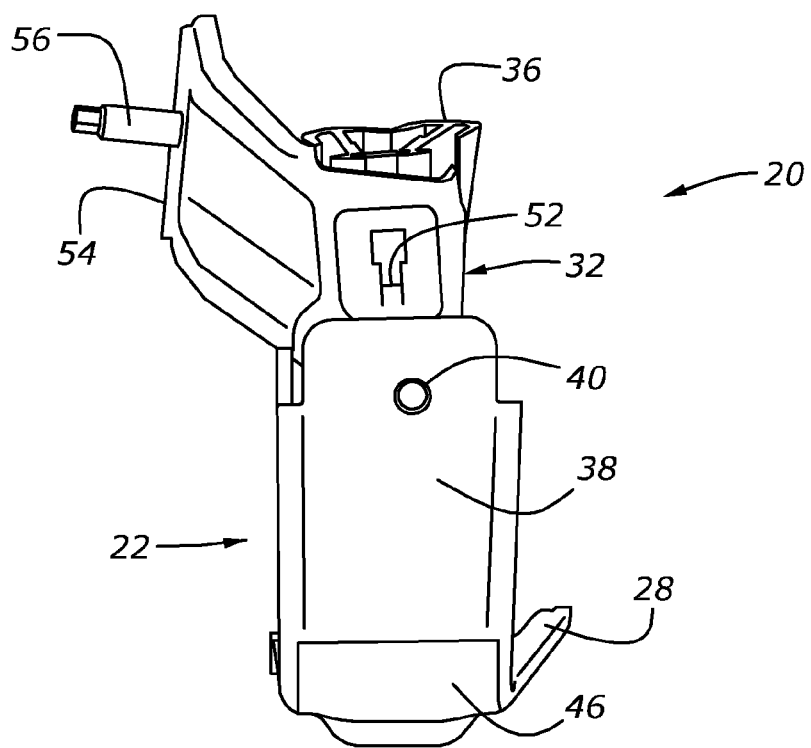
FIG. 10 is a front view of the vehicle door glass blocker assembly of FIG. 3, taken generally in the direction of arrows 10-10 in FIG. 9.

As shown in FIG. 7, glass run extrusion 36 may be secured to support bracket 32 by a pair of channel tabs 52 that are integrally formed from the vertical channel portion of support bracket 32. Each channel tab 52 may be an elongated body portion and may include a head portion at the terminal end of the elongated body that is generally wider than the elongated body portion. Each channel tab 52 may be adapted to be received into an aperture formed through a longitudinal surface of glass run extrusion 36, or that may pierce through glass run extension 36 and subsequently be crimped over to thereby retain glass run extrusion 36 to support bracket 32, and the head portion of channel tab 52 may have a width greater than the diameter of the aperture on glass run extrusion 36. Due to the elastomeric nature of the glass run extrusion 36 material, the head portion of channel tab 52 may be pushed through the aperture of glass run extrusion 36. Undercuts formed on the head portion of channel tab 52 may capture the glass run extrusion against support bracket 32, thus securing the glass run extrusion 36 to support bracket 32.

Support bracket 32 may also include a substantially longitudinally disposed side support member 54 integrally formed with support bracket 32 and adapted to secure support bracket 32 to vehicle door frame side panel 34. Side support member 54 may include a mating surface that is substantially planar and parallel to a corresponding mating surface on vehicle door frame side panel 34. In an exemplary embodiment, an aperture on the mating surface of side support member 54 is adapted to receive a stud 56 which in turn is adapted to be received into a corresponding aperture on the mating surface of vehicle door frame side panel 34. In order to secure support bracket 32 to vehicle door frame side panel 34, stud 56 may be inserted in the aperture on frame side panel 34, and then inserted into the aperture of vehicle door frame side panel 34. Stud 56 may then be attached to the vehicle door by any means known in the art, thereby securing support bracket 32 to vehicle door frame side panel 34.

Operation of vehicle door glass blocker assembly 20 will now be described in detail with reference to FIGS. 1A and 2.

Specifically, in the event of a frontal or offset frontal crash event, the vehicle's door frame structure could compress due to the forces imparted on the door frame in a longitudinal direction. This structural failure, and the associated reduction in the overall length of the vehicle's door, can propel vehicle window 26 towards vehicle door frame rear panel 24. However, as vehicle window 26 is rearwardly displaced, vehicle window 26 may impact rigid blocking edge 50 of blocking bracket 22 that is secured to vehicle door frame rear panel 24. If vehicle window 26 impacts blocking edge 50 with a relatively small amount of force, blocking edge 50 prevents further rearward displacement of vehicle window 26, and blocking protrusion 28 blocks vehicle window 26 from impacting door latch actuator rod 30, thus preventing the vehicle window 26 from contacting and actuating door latch actuator rod 30, thereby preventing the vehicle's door from opening. If vehicle window 26 is propelled toward blocking bracket 22 with a sufficient amount of force, vehicle window 26 will shatter upon contact with the rigid blocking edge 50. In this case, blocking protrusion 28 still remains in place to prevent any partially shattered vehicle window 26 from transversely displacing towards, and impacting, door latch actuator rod 30, so that the shattered glass no longer poses a threat to actuate the latch.

Those skilled in the art would readily appreciate in view of this disclosure that various modifications could be made to vehicle door glass blocker assembly 20 described above, without departing from the scope of the present invention. For example blocking bracket 22 may be secured to vehicle door frame rear panel 24 by any means known in the art, including adhesive bonding and welding. Additionally, blocking bracket 22 may be secured to vehicle door frame rear panel 24 using any number and configuration of mechanical fastening devices, such as bolts, screws, or rivets. Moreover, the blocking bracket may be secured to one or more of the plurality of vehicle door frame panels. It is also contemplated that blocking protrusion 28 may be coupled to blocking bracket 22 by any means known in the art, including adhesive bonding, welding, or mechanical fastening.

Further, support bracket 32 can be coupled to blocking bracket 22 using any means known in the art. Specifically, support bracket 32 can be secured to support bracket mounting surface 48 using an adhesive bond or by using one or more mechanical fastening devices. It is also contemplated that support bracket 32 can be integrally formed with the blocking bracket. Additionally, glass run extrusion 36 can be coupled to support bracket 32 using any means known in the art, including by the use of an adhesive bond or by using one or more mechanical coupling devices.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A vehicle including a vehicle door glass blocker assembly comprising:
   a vehicle door frame panel;
   a blocking bracket secured to the vehicle door frame panel and having a bracket blocking edge that extends across and is normal to a vertical edge of a vehicle window when secured to the vehicle door frame panel, and at least partially shattering the vehicle window during a frontal crash event;

a blocking protrusion coupled to said blocking bracket, disposed longitudinally between the vehicle window and a vehicle door latch mechanism, and at least partially preventing transverse displacement of the vehicle window; and a support bracket secured to said blocking bracket.

2. A vehicle including a vehicle door glass blocker assembly comprising:

a vehicle window;

a vehicle door frame panel adjacent the window;

a blocking bracket secured to the vehicle door frame panel; and a bracket blocking edge extending from said blocking bracket across and substantially transverse to the vehicle window edge, the bracket blocking edge at least partially shattering the vehicle window during a frontal crash event; and a support bracket adjacent to said blocking bracket.

3. A vehicle according to claim 2, further comprising a blocking protrusion coupled to said blocking bracket, being generally longitudinally disposable between the vehicle window and a vehicle door latch mechanism, and at least partially preventing transverse displacement of the vehicle window.

4. A vehicle according to claim 3, wherein the support bracket is secured to said blocking bracket.

5. A vehicle according to claim 4, further comprising a glass run extrusion secured to said support bracket, accepting an edge of the vehicle window, and reducing vibrations in the vehicle window.

6. A vehicle according to claim 5, further comprising at least one channel tab integrally formed with a channel portion of said support bracket, said channel tab securing said glass run extrusion to said channel portion of said support bracket.

7. A vehicle including a vehicle door glass blocker assembly comprising:

a vehicle door frame panel;

a blocking bracket secured to the vehicle door frame panel and having a bracket blocking edge that extends across and is substantially transverse to a vehicle window edge, the bracket blocking edge at least partially shattering the vehicle window when the vehicle window edge impacts said blocking edge during a frontal crash event.

8. A vehicle according to claim 7, further comprising a blocking protrusion coupled to said blocking bracket, being generally longitudinally disposed between the vehicle window and a vehicle door latch mechanism, and at least partially preventing transverse displacement of the vehicle window.

9. A vehicle according to claim 8, further comprising a support bracket secured to said blocking bracket.

10. A vehicle according to claim 9, further comprising a glass run extrusion secured to said support bracket, accepting an edge of the vehicle window, and reducing vibrations in the vehicle window.

11. A vehicle according to claim 10, further comprising at least one channel tab integrally formed with a channel portion of said support bracket, said channel tab securing said glass run extrusion to said channel portion of said support bracket.

* * * * *

UNITED STATES PATENT AND TRADEMARK OFFICE
Certificate

Patent No. 7,748,166 B2                                                              Patented: July 6, 2010

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Donald P. Iacovoni, Plymouth, MI (US); Paul L. Heirtzler, Northville, MI (US); Jason D. Scott, Farmington Hills, MI (US); Martin A. Trenkle, Dearborn, MI (US); Thiag Subbian, Farmington Hills, MI (US); Echung Su, Rochester Hills, MI (US); Don K. Wallace, Riverview, MI (US); Bhimaraddi Venkaraddi Alavandi, Canton, MI (US); and Chunhui Kevin Lee, Troy, MI (US).

Signed and Sealed this Twenty-first Day of June 2011.

*KATHERINE W. MITCHELL*
*Supervisory Patent Examiner*
Art Unit 3634
Technology Center 3600